June 25, 1963 W. W. ADAMS 3,095,478

TELEPHONE ALARM DEVICE

Filed March 25, 1960 3 Sheets-Sheet 1

*INVENTOR.*

WAYNE W. ADAMS

*BY* James R. Head

Paul H. Johnson

ATTORNEYS

June 25, 1963 W. W. ADAMS 3,095,478

TELEPHONE ALARM DEVICE

Filed March 25, 1960 3 Sheets-Sheet 2

INVENTOR.
WAYNE W. ADAMS
BY James R. Head
Paul H. Johnson
ATTORNEYS

June 25, 1963 W. W. ADAMS 3,095,478

TELEPHONE ALARM DEVICE

Filed March 25, 1960 3 Sheets-Sheet 3

INVENTOR.
WAYNE W. ADAMS
BY James R. Head
Ralph H. Johnson
ATTORNEYS

United States Patent Office 3,095,478
Patented June 25, 1963

1 2

3,095,478

TELEPHONE ALARM DEVICE

Wayne W. Adams, Tulsa, Okla., assignor, by mesne assignments, to Frontier Manufacturing Company, Tulsa, Okla., a corporation of Oklahoma Filed Mar. 25, 1960, Ser. No. 17,701
7 Claims. (Cl. 179—5)

This invention relates to a telephone alarm device, and more particularly to a mechanism whereby a telephone can be made to provide a warning, such as the presence of a burglar or a fire.

In many instances it is advantageous for the owner of a store, lumber yard, dry cleaning establishment and so forth, to know when a burglar has entered his premises, or when a fire has started. In some instances fire and burglar alarm systems are installed but they merely serve to give a loud warning at the place of the business and there is no provision whatsoever for advising the store owner that trouble has existed at his store.

Many of the present burglar alarm systems simply serve to set off a loud alarm in the presence of the store which serves to scare the burglar away, many times allowing him to proceed to rob the establishment and immediately leave.

It is an object of this invention to provide a mechanism whereby a telephone is dialed upon the closure of a circuit whereby a remote telephone receiver is actuated to indicate the presence of a fire or burglar at the position of the mechanism.

Another object of this invention is to provide a means of dialing a telephone automatically, which does not require the manipulation of the telephone dial.

Another object of this invention is to provide a mechanism associated with the telephone whereby the telephone is used as an instrument for reporting such things as fires or burglars, and which does not, in any way, interfere with the normal use of the telephone.

Another object of this invention is to provide a mechanism which, in one of its aspects, may be used in association with a telephone to automatically dial a preselected telephone number which does not connect in any way electrically with existing telephone circuits.

Another object of this invention is to provide a mechanism which will automatically dial a telephone upon the closure of a circuit and which is relatively inexpensive to manufacture and more dependable than other devices presently known.

Another object of this invention is to provide a mechanism whereby a remote telephone will be dialed and whereby a person lifting the receiver of the remote telephone will be advised by signals of the existence of a fire, a burglar, or the like, at the place where the mechanism of this invention is positioned.

These and other objects and a better understanding of this invention may be had from the following description and claims taken in conjunction with the attached drawings in which:

Figure 1:
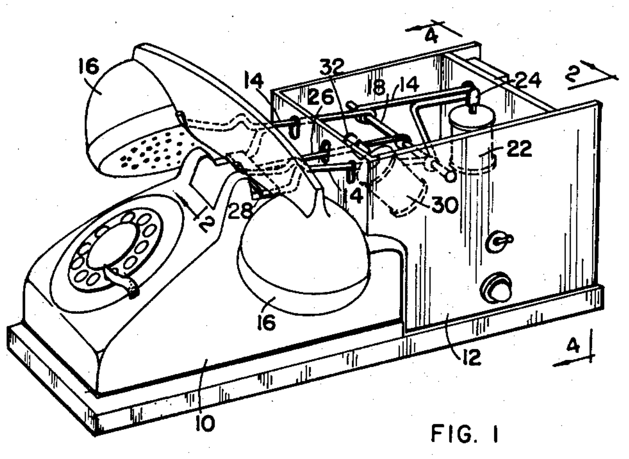
FIGURE 1 is an isometric view of the mechanism of this invention positioned adjacent a telephone with which it is used.

Referring now to the drawings, and first to FIGURE 1, the device of this invention is shown in a position adjacent a telephone. The telephone subset is indicated by numeral 10, and is a telephone user's set of standard construction. It will be seen from the disclosure that the variation in the configuration of the telephone subset will not materially affect the mechanism of the invention, and that the principles of the invention may be incorporated to use telephone subset 10 of any design or configuration. The mechanisms of this invention are contained in case 12 which is positioned directly behind the telephone subset so as not to interfere with its use.

Handset arms 14 extend out of case 12 and under the telephone handset 16. Handset arms 14 are pivoted at pivot bar 18 and are positioned beneath the telephone handset 16 so that in normal use the telephone handset 16 rests against telephone subset 10, depressing the handset buttons 20. (See FIGURE 2.) A handset solenoid 22, having a plunger 24, is affixed to handset bars 14 in such a manner that when handset solenoid 22 is energized, the telephone handset 16 is lifted, permitting handset buttons 20 to rise in the same manner as occurs when the telpehone handset 16 is lifted manually from telephone subset 10 during the normal use.

A button arm 26 extends from case 12 and is pivoted by pivot bar 18. Button arm 26 has a button bar 28 affixed to it parallel to the telpehone handset when the handset is positioned on telephone subset 10 while not in use. Button bar 28 is disposed in such position that it rests on top of both of the handset buttons 20 found on the typical telephone subset 10. A button solenoid 30 is provided within case 12, having a plunger 32 which is affixed to button arm 26. When button solenoid 30 is energized, retracting plunger 32, button arm 26 is pulled downward depressing handset buttons 20. During normal use of the telephone, solenoid 30 will not be energized. When telephone handset 16 is removed, handset buttons 20, by spring pressure provided against them within the telephone subset 10, rise, pushing button bar 28 upward, so that the telephone subset 10 operates in its usual manner.

Figure 2:
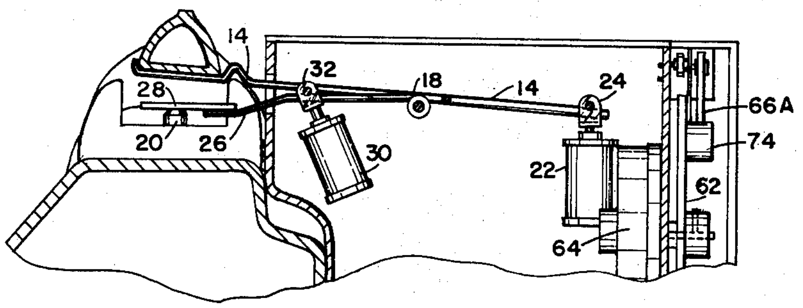
FIGURE 2 is a cross-sectional view taken along the line 2—2 of FIGURE 1.
Figure 4:
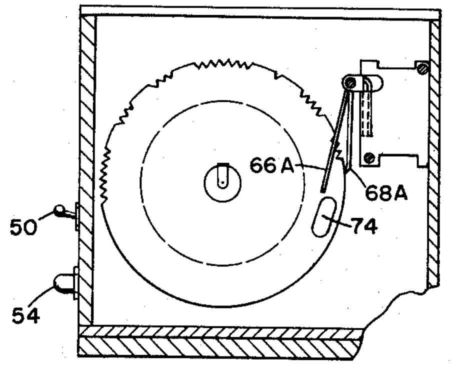
FIGURE 4 is a cross-sectional view taken along the line 4—4 of FIGURE 1, showing the dialing wheel of the invention.
Figure 3:
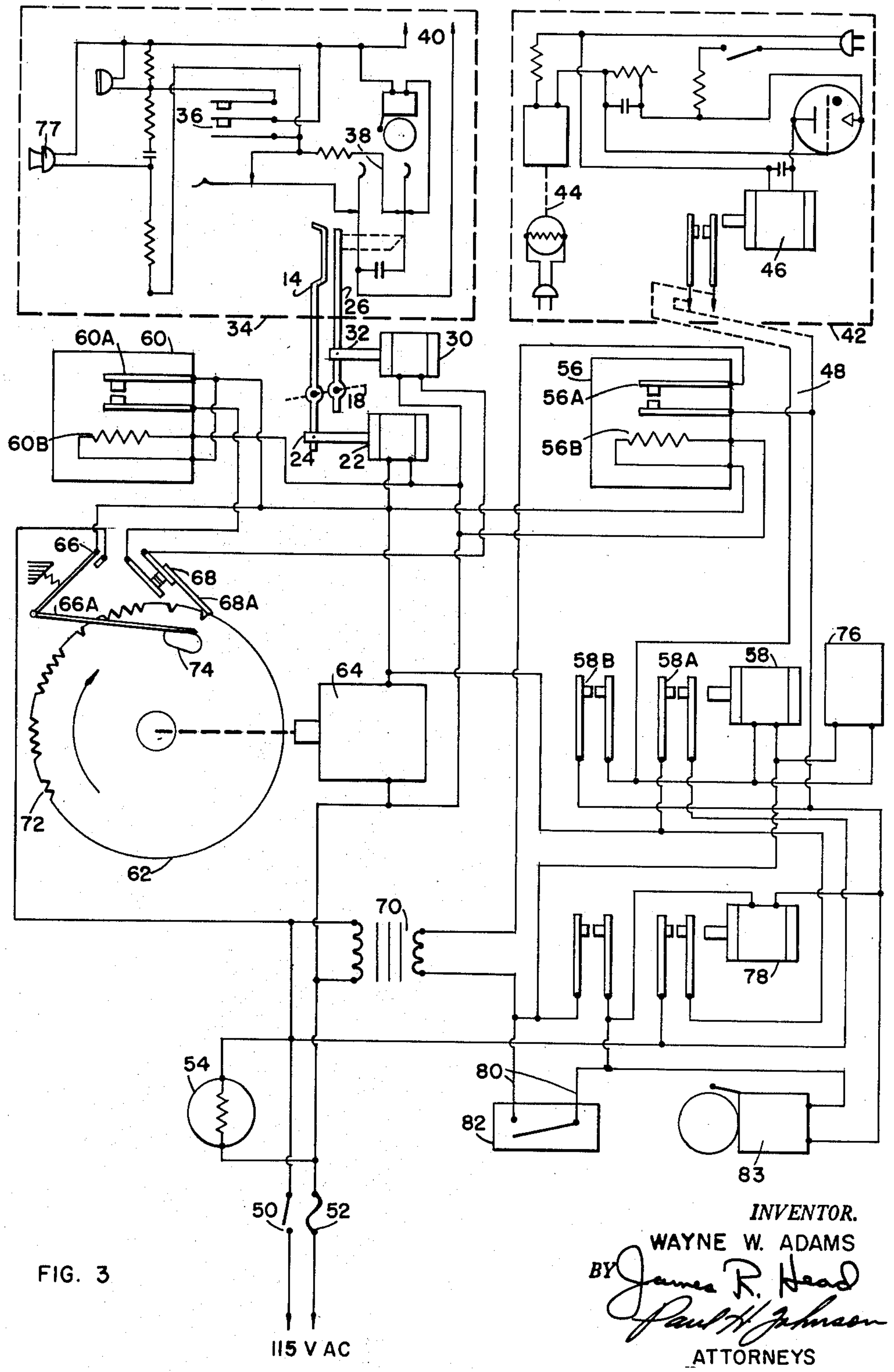
FIGURE 3 is a schematic diagram of the mechanism of this invention.

Referring now to FIGURE 3, the circuit means are shown whereby the mechanism of FIGURES 1, 2 and 4 is operated to achieve the desired results of the invention. The numeral 34 indicates the internal wiring diagram of a typical telephone subset, which is enclosed in dotted lines. As stated in the objects of the invention, the mechanism of this invention, in one of its aspects, permits the dialing of a telephone without in any way interfering with the electrical circuitry of the telephone subset and is not connected electrically to it. The telephone circuit 34 is shown to describe the means whereby dialing is accomplished by the mechanism of this invention without in any way manipulating the telephone dial found on most telephone subsets. The switch indicated by the numeral 36 is the switch which is actuated in the usual telephone circuit when the dial (not shown) has been turned to the position where the finger hits the finger rest and released so that on its return the switch 36 is successively opened and closed a number of times according to the number in which the finger is placed on the dial. Thus if the number two is dialed, when the dial is returning from the position where the finger hits the finger rest to its normal position, the switch 36 is opened and closed two times sending out two pulses on the telephone conductors 40 which connect to the telephone exchange (not shown). This sets up a sequence of signals selecting certain circuits in the telephone exchange. It is understood that by the expression "telephone exchange" is meant all the telephone equipment to which a telephone circuit connects whereby the dialing pulses attain automatic connection with the predetermined number or preselected telephone receiver station. The telephone exchange may be said to include a multiplicity of numbers, or stations, one of which is preselected to be signaled.

A switch indicated by the numeral 38 is the switch which is actuated by the buttons 20, shown in FIGURE 2. Buttons 20 protrude upward when the telephone handset 16 is manually lifted in the normal use of telephone subset 10. In normal telephone usage the dialing signal is placed upon the telephone conductors 40 by the dial switch 36. In this invention the dialing signal is placed upon telephone conductors 40 by manipulation of button switch 38.

Handset arm 14 is shown adjacent the telephone circuit 34, along with button arm 26. When handset solenoid 22 is actuated, retracting plunger 24, handset arm 14 is pivoted to raise the handset 16 (not shown as an entity in telephone circuit 34) allowing button switch 38 to move to its upward position, or the position attained during normal use of the telephone subset 10, when handset 16 is lifted. With handset 16 lifted by handset arm 14, the actuation of solenoid 32, moving button arm 26 downwardly, serves to close button switch 38. By actuation of button solenoid 30 in rapid sequence a signal will be imposed on telephone conductors 40 in the same manner that a signal is created by dial switch 36. In this manner, a telephone dial signal can be sent out to dial any prescribed number by the sequential actuation of button solenoid 30.

Also enclosed in dotted lines on FIGURE 3 is a photoelectric circuit 42. This circuit is shown as an example of the control devices which may be incorporated with this invention to signal the presence of a burglar. The photoelectric circuit of numeral 42 is of standard design and is not a part of the novelty of this invention. When the beam of light 44 is interrupted, relay 46 is energized presenting a closed circuit to actuate the mechanism of this invention. The photoelectric circuit 42 is just one example of a manner in which the mechanism of this invention may be actuated to dial a telephone alarm. Any type of device which serves to merely close a circuit is all that is required to put the mechanism into operation. Control conductors 48 are shown extending to the photoelectric circuit 42. Any function which serves to short circuit control conductors 48 will set up the alarm mechanism of this invention to dial a predetermined telephone number.

The circuit of this invention is connected to a power source, such as the usual 110 volt A.C. source, found in most store buildings. A switch 50 is provided whereby the mechanism may be disconnected when its service is not required. Also positioned in the power circuit is a fuse 52. A pilot light 54 is provided so that it can be easily observed when the unit is on and ready for automatic operation. The major circuit elements used to actuate the device to dial a number when the photoelectric circuit 42 provides continuity between control conductors 48 are as follows: a warning delay relay 56; a burglar relay 58; a dialing delay relay 60; a dialing disk 62; a dialing motor 64; a disk stopping switch 66, and a dialing actuator switch 68.

A transformer 70 is positioned across the 110 volt input line to provide a reduced secondary voltage so that the reduced voltage may be run on small conductors 48 to burglar detecting devices in various parts of the building being protected. When the control conductors 48 are close circuited by photoelectric circuit 52, the reduced voltage, for instance, twenty-four volts, is placed through contacts 56A of warning delay relay 56. Delay relay 56 is a normally closed relay so that contacts 56A are closed until heat is provided on filiament 56B for approximately sixty seconds to cause contacts 56A to open. Current flowing through relay 56A causes burglar relay 58 to energize closing contacts 58A and 58B. When contact 58B closes voltage is maintained across relay 58 so that it remains closed even though the closed circuit formed by photoelectric circuit 42 across control conductors 48 is removed. Thus if the beam of light 44 in photoelectric circuits 42 is broken for just an instant, relay 58 is energized and remains energized.

Closing contacts 58A places voltage across handset solenoid 22, causing it to energize. When handset solenoid 22 energizes the handset 16 (see FIGURE 1) is raised by handset arm 14, placing the telephone subset 10 in a position for dialing. Closing contact 58A also places voltage on dialing disk motor 64 causing it to start rotation.

When dialing disc 62 rotates, notches 72 contact arm 68A of dialing actuator switch 68 so that switch 68 is closed each time a notch 72 is encountered. Each time dialing actuator switch 68 closes voltage is placed across button solenoid 30 causing it to energize and lower button arm 26. This operates button switch 38 of the telephone sending out a dialing pulse on the telephone conductors 40. The periphery of dialing disc is so formed, with notches 72 and spaces therebetween, so that button arm 26 sends out a dialing signal equivalent to the manual dialing of the telephone dial. The number desired to be called when the alarm is to be sounded is coded onto the dialing disc 62. In the example shown in FIGURE 3 the number dialed will be the number 1141542. Any combination of numbers may be placed on the dialing disc desired. Typically, if the mechanism of this invention was used on a telephone subset 10 placed in a dry cleaning establishment, the owner of the dry cleaning business would require the notches 72 on dialing disc 62 to be formed so that the telephone set at his home would be dialed in case of a fire, burglary, or so forth.

A stop point projection 74 is placed on one face of dialing disc 62 to engage arm 66A of disc stopping switch 66. When dialing motor 64 rotates dialing disc 62, stop point projection 64 will disengage from switch arm 66A allowing disc stopping switch 66 to close. When disc stopping switch 66 closes it is closed in parallel with switch 58A. Therefore motor 64 will continue to rotate even after relay 58 is no longer energized, until stop point projection 74 engages switch arm 66A to open switch 66. This means that dialing disc 62 will always be stopped in the position indicated on the drawing, or the starting position, so that a false number cannot be dialed by beginning the dialing cycle in the wrong position.

When current is applied to motor 64 it is also supplied to heater element 60B of dialing delay relay 60. Dialing delay relay 60 is a thermo actuated normally closed relay so that after current is applied to it, heating filament 60B for approximately 20 seconds, it opens, breaking the circuit contact 60A. Dialing motor 64 is a one revolution per minute speed motor. Since the notches 72 making up the dialing number are contained in less than one-half of the periphery of dialing disc 62, dialing delay relay 60 remains closed during approximately the first half of the rotation of dialing disc 62. After this first half rotation of dialing disc 62, dialing delay relay 60 opens which breaks the circuit with button solenoid 30. Therefore, if motor 64 continues to rotate button solenoid 30 will only be actuated through one sequence to call a number. The provision of dialing delay relay 60 is optional, as a precautionary measure only, to make certain that the dialing number will not be dialed twice. It can be seen that this element can be eliminated without altering the basic operation of the device.

Warning delay relay 56 is a normally closed thermally operated time delay relay having a time lapse of approximately sixty seconds from the time current is applied to the heater element 56B before contacts 56A are opened. Thus, when a short circuit is formed on control conductors 48, as by a burglar tripping the photoelectric circuit 42, burglar relay 58 is closed and will remain closed until warning delay relay 56 opens connectors 56A. This breaks the circuit with burglar relay 58 causing it to de-energize. This removes the circuit to motor 64, except through disc stopping switch 66. Dialing disc 62 will continue to rotate until stop point projection 74 engages switch arm 66A at which point dialing motor 64 will stop. The sixty second time delay allowed by warning delay relay 56 is sufficient to allow a number to be dialed and let the number ring two or three times.

After the warning delay relay 56 is heated and breaks contact 56A, and disc stopping switch 66 is opened, voltage will be removed from handset solenoid 22 causing the handset 16 to be replaced on the telephone 10, hanging up the telephone and disconnecting the circuit which was dialed. This gives the user of the mechanism, that is, the number which was dialed, a chance to dial or use his telephone to call the police, the fire station, or so forth.

After voltage is removed from warning delay relay 56, occurring at the same time voltage is removed from handset solenoid 22, a short delay will occur during which cooling off of warning delay relay 56 occurs and when it has sufficiently cooled switch contacts 56A will again close. If continuity is continued to be maintained between control conductors 48 the cycle will again repeat itself to dial the selected number and ring two or three times. If the circuit between control conductors 48 has opened in the meantime, the cycle will not be repeated and the mechanism will remain in its ready state to immediately dial the number when continuity across circuit conductors 48 is again completed.

In parallel with burglar relay 58 is positioned a buzzer 76. During the time burglar relay 58 is closed buzzer 76 will be making an audible sound which will be picked up by the handset mouth piece 77. When a burglar trips the photoelectric circuit 42, causing a mechanism to dial the pre-selected number, if the telephone is immediately answered at the telephone associated with the preselected number, in this example the owner of the dry cleaning establishment, buzzer 76 will be heard. This will indicate to the owner that a burglar has tripped the alarm at his dry cleaning establishment. In a short time the telephone at his establishment will be hung up when relay 56 opens, disconnecting the circuit with his telephone at home and giving him an opportunity to call the police.

A separate system is shown in the circuit diagram of FIGURE 3 to serve as a fire alarm system. A fire relay 78 is provided which parallels and duplicates the functions of burglar relay 58. Affixed to fire relay 78 are fire alarm conductors 80 which lead to fire detecting thermostats 82. When a short circuit develops across fire alarm conductor 80, as by heat from a fire closing thermostats 82, fire relay 78 is energized to set off the same sequence of functions as previously described when burglar relay 58 is energized. The only difference between the circuits associated with fire relay 78 and the circuits associated with burglar relay 58 is that a bell 83 is placed in parallel with fire relay 78 so that when the telephone is answered, corresponding to the number formed on the dialing disc 62, bell 83 will be heard so that the person answering the phone will know that a fire exists at the place the device of this invention is located.

It can be seen that additional relays (not shown) equivalent to fire relay 78 and burglar relay 58 can be positioned in a circuit with different sounding alarms, such as whistles and sirens, to indicate other defects which might be required. For instance a whistle could be used to indicate the existence of high water in the basement of the building.

Although only one thermostat 82 is shown and only one photoelectric circuit 42 is shown it is understood that any unlimited number of these devices may be placed in parallel across control conductors 48 and fire alarm conductors 80 so that the alarm system of this invention may be set off from innumerable places throughout a building area.

The invention has been described incorporating a mechanism adaptable for use with the typical telephone user's subset. It can be seen that many variations can be made applying the principles of the invention. One such variation can be accomplished as follows: Handset solenoids 22 and handset arm 14 can be eliminated. Button arm 26 is biased downward, as with a spring (not shown). Button solenoid 30 is disposed, when actuated, to overcome the force of the spring and permit button arm 26 to rise, permitting buttons 22 to rise, closing telephone circuit 90. Dialing actuator switch 68 is altered so that when a notch 72 is encountered on dialing disc 62, the dialing switch 68 is opened. An off positioned recess 84 (see FIGURE 5) is provided at the position switch arm 68A would make contact in the non-operative status of dialing disc 62. Using this system wherein the handset arm 14 and handset solenoid 22 is eliminated, the telephone handset 16 would be merely set aside when the mechanism of this invention is to be used with the telephone subset 10. Button arm 26, with button bar 28 attached, serves to hold handset buttons 20 down and preserving the telephone circuit 40 open during non-alarm conditions.

Figure 5:
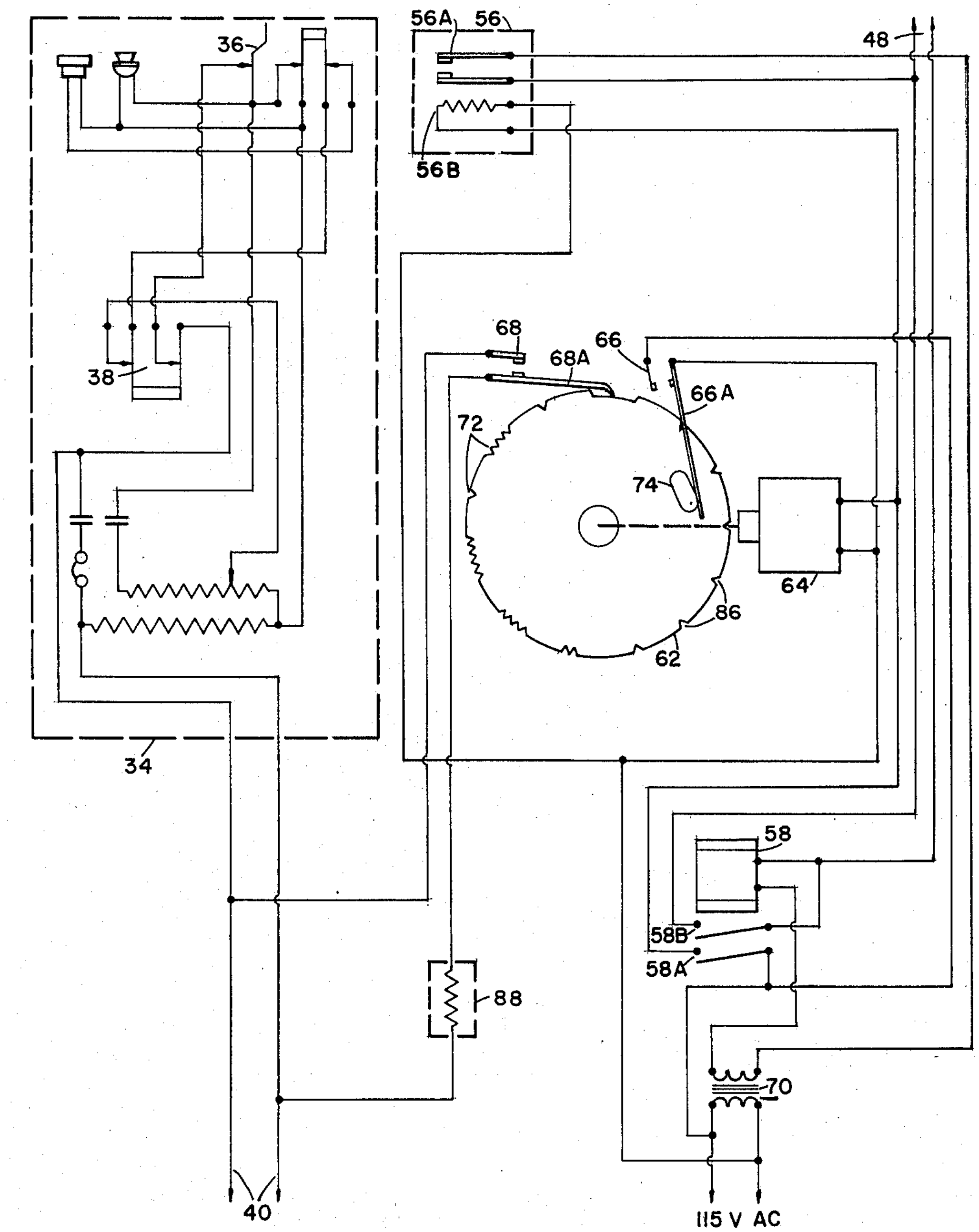
FIGURE 5 is a schematic diagram of an alternate arrangement of the invention.

An alternate method of accomplishing the objectives of this invention using the basic principles of FIGURES 1 through 4 is shown in FIGURE 5. The principle incorporated in FIGURE 5 accomplishes much the same results as previously described, but in a slightly different manner. In this method conductors 85 are attached parallel to the telephone circuit 34, enclosed in dotted lines. If it is a three wire circuit wherein one wire is normally grounded, connection would be made parallel with the ungrounded conductors of the telephone system.

Referring now to FIGURE 5, a dialing disc 62 is provided as previously described, actuated by dialing motor 64. Warning delay relay 56 is used in a manner similar to that previously described and the same applies to disc stopping switch 66. When an alarm situation occurs, control conductors 48 will be short circuited, as by a photoelectric device 42 shown in FIGURE 3. With conductors 48 short circuited, power is supplied through the normally closed contact 56A of warning delay relay 56 to energize burglar relay 58. A momentary closure of contacts 48 closes contact 58B so that burglar relay 58 will remain closed until the circuit is opened by warning delay relay 56. Upon actuation of burglar relay 58, switch 58A also closes supplying a voltage source to dialing motor 64, causing it to start rotating dialing disc 62.

It will be noted that there is provided on the periphery of dialing disc 62 an off position recess 84 covering a segment of approximately ten to fifteen degrees. This is the position dialing actuator switch arm 68A holds when dialing disc 62 is in the normal or off position, which may be also termed the non-alarm position. When switch arm 68A is resting in the off portion recess 84 of dialing disc 62, switch 68, which is in parallel with the telephone circuit 40, is open. This means that in the non-alarm position the mechanism of FIGURE 5 in no way interferes with the normal use of the telephone circuit 40. When dialing motor 64 begins to rotate, arm 68A is raised to the normal diameter periphery of dialing disc 62 closing switch 68. This is in effect the same thing that happens circuitwise when the handset 16, of a telephone subset 10 is raised, preparatory to dialing a number.

Notches 72 are provided on the periphery of dialing disc 62 in a spaced relationship so that as dialing disc 62 rotates, switch 68 will open and close in sequence, corresponding to the opening and closing of the telephone circuit 40 occurring during dialing procedure. The circuit effect at the telephone exchange is the same as would occur if the handset 16 of telephone circuit 40 was raised, closing button switch 38 and dialed by actuating dialing switch 36. After dialing disc 62 has rotated dialing notches 72 past switch arm 68A a telephone station is dialed according to the predetermined number of notches 72 formed in the periphery of dialing disc 62. After dialing the number, the telephone circuit 40 is maintained closed by switch 68 being closed, since switch arm 68A will be riding on the periphery of dialing disc 62.

Formed in the periphery of disc 62 are a series of alarm notches 86. When the telephone receiver corresponding to the number formed by notches 72 on dialing disc 62 is called and the party answers, there will be heard a series of clicks occurring each time alarm notches 86 pass switch arm 68A. This will be the only audible message received, but will be sufficient to apprise the listener of the existence of an alarm situation at the place where the mechanism of FIGURE 5 is installed. Notches 86 are not of sufficient duration so that switch 68 will be open long enough to hang up or disconnect the circuit once it has been made in the telephone exchange.

It can be seen that alarm notches 86 may be arranged in an unlimited sequence of codes to identify different positions where mechanisms of FIGURE 5 may be located. For instance a steady click caused by even spacing of notches 86 on the periphery of dialing disc 62 might indicate an alarm at a number one store. At a different store notches 86 may be spaced so as to provide a sound such as click click, pause, click click, pause, etc. Or notches 86 may be arranged to perform a sound such as click, pause, click click, pause, click, pause, click click, etc. In this manner it can be seen that a great number of different codes may be placed on the dialing disc 62 to indicate different locations of the mechanism.

Dialing motor 64 will continue to rotate as long as warning delay relay 56 is closed. In approximately sixty seconds, or any other time desired which may be established by selecting different delay length for warning delay relay 68, the circuit to burglar relay 58 will be broken, causing contacts 58A and 58B to open. If dialing disc 62 has not completed its rotation it will continue to do so until disc stopping switch 66 is opened when switch arm 66A engages stop point projection 74. This means that dialing disc 62 will always stop in the appointed position so that switch arm 68A will be within the off position recess 84. If it happens that warning delay relay 56 has not heated sufficiently to open by the time stop point projection 74 has made one revolution, dialing motor 64 will continue to rotate another complete revolution until stop point projection 74 engages arm 66A of disc stopping switch 66.

After dialing motor 64 has been energized, stopping dialing disc 62, the cycle will be repeated if the alarm situation continues to exist. If control conductors 48 are continued to be shorted, the cycle will start again and repeat the dialing procedure and warning as soon as warning delay relay 56 has cooled sufficiently to allow contacts 56A to make. In this manner the warning will continue to be given as long as the alarm situation exists to short circuit control conductors 48. It can be seen that time delay relays of approximately 10 minutes could be used in conjunction with the mechanism so that when control conductors 48 are short circuited the dialing procedure of the mechanism of FIGURE 5 would continue for 10 minutes and then be cut off permanently until manually reset. Or it would be possible to provide a clock mechanism with on and off positions so that upon the closure of control conductors 48 the dialing procedure would alternate on and off for fifteen minute cycles. It is evident that a great variety of arrangements may be made by using time controlling mechanisms in conjunction with the principles of this invention to perform various types of warning services.

Most telephone circuits 34 have a given impedance in the closed circuit condition, that is, there is not a direct short across telephone conductors 40. This impedance can be duplicated by inserting impedance 88 in series with dialing actuating switch 68 so that the dialing signal of the mechanism of FIGURE 5 will exactly duplicate the dialing signal occurring when manual dialing is performed on the telephone circuit 34.

The mechanism of FIGURE 5, using the principles previously described, has the advantage that mechanical functions required to lift the handset 16, such as handset arms 14, handset solenoid 22, button bar 28, and button solenoid 30 are not required.

Although this device has been described as it particularly pertains to the protection of a building against fire and theft, the device has extensive application in industrial establishments. As an example, a device according to the principles of this invention could be positioned at an unmanned oil pipeline pump station and through various detector means could dial the number of the pump station supervisor to automatically advise him of any difficulties which were occurring at the pump station, such as high engine temperature, high pump pressure, low oil levels and so forth. The advantages of this type of warning system are: First, no additional communication line need be established if a telephone system already exists in the pump station. Second the means of this invention of actuating the telephone to report any defects can be accomplished very inexpensively compared to existing type of warning devices; and third, the use of this device in conjunction with a telephone system does not in any way interfere with the normal use of the telephone system.

Although this invention has been described with a certain degree of particularity it is manifest that many changes may be made in the details of construction and the circuit arrangements without departing from the spirit or the scope of this disclosure.

I claim:

1. A telephone alarm device for use in connection with a telephone subset to automatically make connection to ring a pre-selected number, said telephone subset having a handset and handset buttons and wherein said telephone subset is connected by a circuit to a telephone exchange comprising, in combination:
   - a handset arm extending beneath said handset;
   - a handset solenoid affixed to said arm to actuate said arm to lift said handset from engagement with said handset buttons whereby said circuit is closed with said telephone exchange when said handset solenoid is engaged;
   - a button arm extending to engage said handset buttons;
   - a button solenoid affixed to said button arm to actuate to depress said handset buttons when said button solenoid is energized;
   - means of energizing said handset and solenoid;
   - and means of sequentially energizing said button solenoid whereby said handset buttons are sequentially depressed to open and close said circuit whereby a predetermined number is selected and rung by said telephone.

2. A device according to claim 1 wherein said means of sequentially energizing said button solenoid comprises;
   - a dialing disc having notches in the periphery thereof, said notches being in a spaced relationship around the periphery corresponding to said pre-selected number;
   - a dialing actuator switch adjacent said dialing disc;
   - an arm affixed to said dialing actuator switch in engagement with the periphery of said dialing disc whereby when said notches on the periphery of said dialing disc engage said arm, said dialing actuator switch is actuated;
   - circuit means providing continuity between said dialing actuator switch and said button solenoid whereby actuation of said dialing actuator switch actuates said button solenoid;
   - and means of rotating said dialing disc.

3. A device according to claim 2 wherein said dialing disc includes a stop point affixed to one face thereof;
   - a disc stopping switch positioned adjacent said dialing disc;

a switch arm affixed to said disc stopping switch to engage said stop point means;

and circuit means connecting said disc stopping switch with said dialing disc rotating means whereby when said stop point means engages said switch arm said stopping switch is opened to deenergize said disc rotating means to stop rotation of said disc.

4. A device according to claim 1, including a time delay circuit means in continuity with said handset solenoid whereby said handset solenoid is energized for a predetermined length of time and is then deenergized whereby handset returns to its normal position, depressing said handset buttons to open said telephone circuit.

5. A device according to claim 1 including a sound producing device and circuit means associated therewith to energize said sound producing device when said handset solenoid is energized.

6. A device according to claim 5, including a multiplicity of audibly distinguishable sound producing devices;

and separate circuit means associated with each of said sound producing devices to actuate one of said sound producing devices when said handset solenoid is energized dependent upon which of said circuit is energized.

7. A telephone alarm device for use in conjunction with a telephone subset to make connection to ring a preselected number, said telephone subset having handset buttons and wherein said telephone subset is connected by a circuit to a telephone exchange, comprising, in combination;

a button arm disposed to engage said handset buttons and to normally restrain said handset buttons in a downward position whereby said circuit is open;

a button solenoid affixed to said button arm to raise, when energized, said button arm whereby said circuit is closed;

and means of sequentially energizing said button solenoid whereby said handset buttons are sequentially raised to close said circuit whereby a predetermined number is selected and rung by said telephone exchange and whereby said button solenoid is retained in an energized condition after said sequential raising to maintain said circuit in a closed condition for a predetermined length of time.

References Cited in the file of this patent

UNITED STATES PATENTS

| | | |
|---|---|---|
| 1,870,547 | Wise | Aug. 9, 1932 |
| 2,188,055 | Marsh et al. | Jan. 23, 1940 |
| 2,469,278 | Sears | May 3, 1949 |
| 2,512,981 | Svoekhotoff | June 27, 1950 |
| 2,878,315 | Agule | Mar. 17, 1959 |
| 2,907,828 | Tegeler | Oct. 6, 1959 |